United States Patent [19]

Frey et al.

[11] Patent Number: 5,179,881
[45] Date of Patent: Jan. 19, 1993

[54] SYSTEM FOR PRODUCING HELICAL VEGETABLE STRIPS AND TURBINE THEREFOR

[75] Inventors: Max Frey, Portland; Richard S. Livermore, Oregon City; John M. Bowie, Salem, all of Oreg.

[73] Assignee: McCain Foods Limited, Florenceville, Canada

[21] Appl. No.: 690,818

[22] Filed: Apr. 23, 1991

[51] Int. Cl.$^5$ .............................................. B26D 3/11
[52] U.S. Cl. ........................................ 83/98; 83/402; 83/149; 99/537
[58] Field of Search .................. 83/402, 98, 149, 104, 83/865; 99/537

[56] References Cited

U.S. PATENT DOCUMENTS

| | | |
|---|---|---|
| Re. 32,822 | 1/1989 | Hodges et al. . |
| 100,049 | 2/1870 | Lutz et al. . |
| 353,596 | 11/1886 | Seymour, Jr. . |
| 497,675 | 5/1893 | Miller . |
| 522,066 | 6/1894 | De Laval . |
| 782,292 | 2/1905 | Walter . |
| 784,431 | 3/1905 | Rambal . |
| 820,714 | 5/1906 | Guy . |
| 911,540 | 2/1909 | Guilford . |
| 1,094,604 | 4/1914 | Shibata . |
| 1,342,845 | 6/1920 | Elliott . |
| 1,547,838 | 7/1925 | Steenstrup . |
| 1,908,220 | 5/1933 | Chapman . |
| 2,323,637 | 7/1943 | Williams . |
| 2,489,581 | 11/1949 | Mason . |
| 2,508,868 | 5/1950 | Ross . |
| 2,512,921 | 6/1950 | Daugherty . |
| 2,567,248 | 9/1951 | Stahmer . |
| 2,625,883 | 1/1953 | Howser . |
| 2,715,927 | 8/1955 | Cüpper et al. . |
| 2,826,229 | 3/1958 | Necula . |
| 2,947,335 | 8/1960 | Schachet . |
| 2,956,838 | 10/1960 | Thoresen . |
| 3,020,850 | 2/1962 | Meckenstock . |
| 3,108,625 | 10/1963 | Lamb et al. . |
| 3,109,468 | 11/1963 | Lamb et al. . |
| 3,116,772 | 1/1964 | Lamb et al. . |
| 3,152,500 | 10/1964 | Watts . |
| 3,211,202 | 10/1965 | Mason . |
| 3,228,441 | 1/1966 | Elssmann . |
| 3,361,173 | 1/1968 | Lamb . |
| 3,754,834 | 8/1973 | Wolters . |
| 3,799,023 | 3/1974 | Brignard et al. . |
| 3,874,259 | 4/1975 | Chambos et al. . |
| 3,952,621 | 4/1976 | Chambos . |

(List continued on next page.)

FOREIGN PATENT DOCUMENTS

| | | |
|---|---|---|
| 680486 | 2/1964 | Canada . |
| 0059075 | 9/1982 | European Pat. Off. . |
| 842420 | 6/1952 | Fed. Rep. of Germany . |
| 333015 | 8/1930 | United Kingdom . |

OTHER PUBLICATIONS

Journal of American Oil Chemist Society, Nov., 1953.
Ashrae Guide & Databook, Systems & Equipment, 1967, pp. 819, 820.

Primary Examiner—Douglas D. Watts
Assistant Examiner—Allan M. Schrock
Attorney, Agent, or Firm—Seyfarth, Shaw, Fairweather & Geraldson

[57] ABSTRACT

The system comprises a tank containing water and potatoes entrained therein. A food pump transports the mixture through a relatively long accelerator conduit of tapering cross section. Some of the water from the output of this conduit is bypassed in accordance with the setting of a valve. A second conduit also has a tapering cross-section to align the potatoes. A water-operated turbine carries a disc-like cutter which is arranged in close proximity to the output of the second conduit. The cutter cuts the potato into helical lengths. Slitter blades on the cutter further cut the potato into helical strips. The turbine has a rotor which, in turn, carries a flywheel portion, the two parts being integral. Bearings press-fit on the rotor are journalled onto upstream and downstream stators in the turbine. Lubricating water is delivered to the bearing surfaces between the rotor and the stators.

51 Claims, 8 Drawing Sheets

U.S. PATENT DOCUMENTS

| | | |
|---|---|---|
| 4,073,060 | 2/1978 | Hendricks . |
| 4,082,024 | 4/1978 | Hodges et al. . |
| 4,135,002 | 1/1979 | Hodges et al. . |
| 4,190,208 | 2/1980 | Schaeffer et al. . |
| 4,198,887 | 4/1980 | Williams, Jr. . |
| 4,367,667 | 1/1983 | Shibata . |
| 4,372,184 | 2/1983 | Fisher et al. . |
| 4,387,111 | 6/1983 | Müllender . |
| 4,393,737 | 7/1983 | Shibata . |
| 4,423,652 | 1/1984 | Winslow . |
| 4,614,141 | 9/1986 | Mendenhall et al. . |
| 4,619,192 | 10/1986 | Cycyk et al. . |
| 4,628,808 | 12/1986 | Simon . |
| 4,644,838 | 2/1987 | Samson et al. . |
| 4,704,959 | 11/1987 | Scallen . |
| 4,807,503 | 2/1989 | Mendenhall . |
| 4,911,045 | 3/1990 | Mendenhall . |
| 4,926,726 | 5/1990 | Julian . |
| 4,979,418 | 12/1990 | Covert et al. . |
| 5,042,342 | 8/1991 | Julian .................................. 83/402 |

SYSTEM FOR PRODUCING HELICAL VEGETABLE STRIPS AND TURBINE THEREFOR

BACKGROUND OF THE INVENTION

This patent application relates generally to a system for mass producing helical vegetable strips, and specifically to such a system which includes hydraulic delivery means and hydraulically driven cutter means, and also relates to a hydraulic turbine used to rotate a helical cutter, as well as the cutter itself. French fried potatoes and other vegetables made from generally spiral or helical shaped strips (popularly known as "curlicue" fries) have become increasingly popular. Consumers like them because of their interesting appearance, and they are appealing to institutional food providers and restaurateurs because a given weight of french fries occupies a greater volume when they are of helical shape.

Systems for producing helical french fries are currently available in the marketplace and are the subjects of several U.S. patents. Such systems are mechanical in nature, that is, the cutter which slices the potatoes or other vegetables into helically shaped strips is mechanically driven by a motor, and the portion for delivering the potatoes to the cutter is also mechanical in nature. These mechanical delivery mechanisms involve gripping the potatoes one by one and carrying them to the cutter. Such a system is too slow, and it is expensive to build and maintain.

To make the usual, long french fries, hydraulic delivery systems are common. These systems receive water in which the potatoes or other vegetables are entrained. In the case of potatoes, for example, a high-capacity food pump delivers or throws the water-potato mixture against a checkerboard pattern of knives. Such a delivery mechanism is commonly referred to as a "gun" and finds widespread use because of its capability of producing long potato strips at high rates.

SUMMARY OF THE INVENTION

It is, therefore, an important object of the invention to provide a system to produce helical potato strips or other vegetable strips at a much faster rate than has heretofore been accomplished.

Another object is to provide a system that mass produces helical strips of potatoes or other vegetables which is completely hydraulic, that is, the system includes a hydraulic delivery mechanism and a hydraulically operated cutter.

Another object is to provide a system for mass producing helical potato strips and other vegetable strips which is simpler and less expensive to manufacture, is easier to maintain and is less likely to break down.

Another object is to provide an improved hydraulic turbine.

Another object is to provide an improved cutter for use with a hydraulically driven turbine for cutting potatoes or other vegetables into helically shaped strips.

Another object is to provide a system to produce helical potato strips or other vegetable strips at a better recovery than is achievable with currently available mechanically fed systems.

In summary there is provided a hydraulic system for cutting potatoes or other vegetables into generally helically shaped strips comprising input means for receiving a liquid carrier and the vegetables, a conduit for the liquid carrier and the vegetables, the conduit having an inlet and an outlet, pump means coupled between the input means and the inlet for transporting the liquid carrier and the vegetables into, through and out the conduit, a turbine coupled to the outlet of the conduit and including a rotor and a multiplicity of vanes thereon and at least one nozzle aimed at the vanes, the nozzle being adapted to generate a jet of liquid to cause rotation of the rotor, and a cutter coupled to the rotor and being rotated thereby, the cutter including means for slicing the vegetable into helically shaped strips.

In another aspect of the invention there is provided a turbine comprising a housing, a rotor, a multiplicity of vanes on the rotor, nozzle means aimed at the vanes and being adapted to generate a jet of liquid to cause rotation of the rotor, and a flywheel on the rotor.

In another aspect of the invention, there is provided a cutter being generally circular and including a radial slit therein defining a pair of cutting edges which are axially spaced, and a plurality of notches around the periphery thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figures 1, 2:
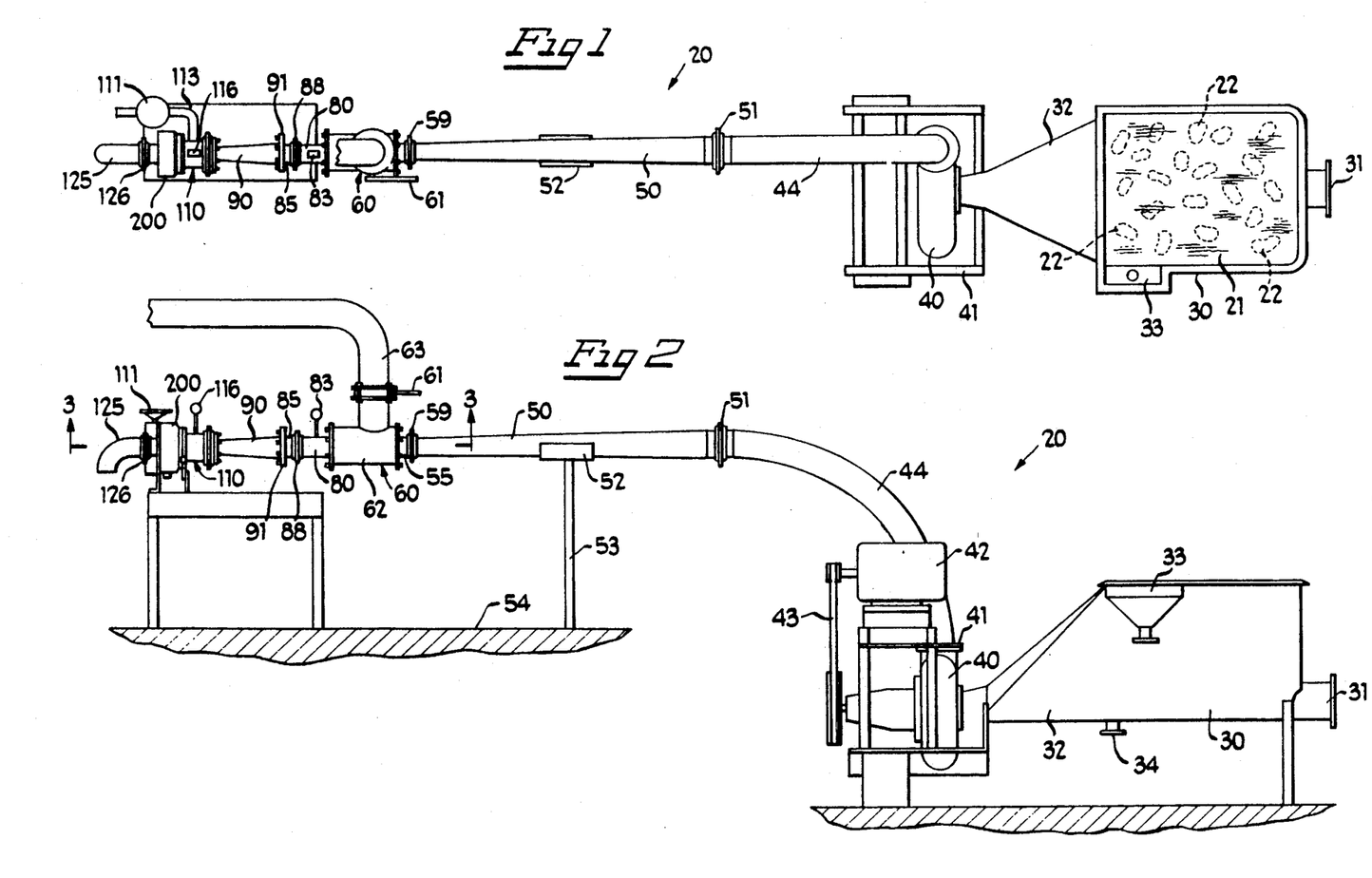
FIG. 1 is a top plan view of a system for producing helical potato strips incorporating the features of the present invention.
FIG. 2 is an elevational view of the system of FIG. 1.

Turning now to FIGS. 1 and 2, there is depicted a system for cutting potatoes into generally helically shaped strips incorporating the features of the present invention. The system is generally designated by the number 20. System 20 receives a mixture of water 21 and potatoes 22 and cuts the potatoes into helically shaped strips. Potatoes 22 are preferably of the Russet Burbank variety having a long axis and a generally round cross section. It is to be understood that many kinds of potatoes may be processed by system 20. Before being applied to system 20, the potatoes may be scrubbed and peeled before or after cutting. The potatoes are usually blanched or partially cooked after cutting. Prior to being introduced to system 20, the potatoes are sized and preheated being divided into a first group for potatoes having a cross dimension of 2.25 to 2.75 inches and a second group having a cross dimension in the range of 1.5 to 2.25 inches. The reason for the sizing will be described hereinafter. A tank 30 contains a mixture of a liquid, such as water 21, and potatoes 22. Tank 30 has an inlet 31, a funnel 32 through which the potatoes exit tank 30, an overflow 33 and a drain 34.

System 20 further comprises a food pump 40 mounted on a frame 41. Also mounted on the frame is a variable-speed motor 42 which operates pump 40 via a belt 43 (elements 42 and 43 are omitted from FIG. 1). Pump 40 draws the potatoes and water through funnel 32. The pump may be one made by Cornell Manufacturing Company of Portland, Oregon and disclosed in its U.S. Pat. No. 3,743,437. Other pumps can be used. Coupled to the outlet of pump 40 is a curved pipe 44. The outlet of pipe 44 is coupled to a conduit 50 by means of a coupler 51. Conduit 50 is supported by a saddle 52 carried by a post 53 attached to an elevated deck 54. In the embodiment depicted, conduit 50 is tapered, having a converging cross section. Conduit 50 could be cylindrical. As a result, the water and the potatoes are accelerated, thereby longitudinally spacing the potatoes from each other within the water stream. In an operating embodiment, conduit 50 was composed of stainless steel and had a length of about 66 inches.

Means to singulate the potatoes other than conduit 50 may be employed, such as use of a vibratory feeder that delivers potatoes to a conveyor, which, in turn, deposits them through a guide tube into tank 30. By increasing the speed of the conveyor, the potatoes fed on to it can be progressively spaced apart. This, together with the guide tube, provides a singulated feed and minimizes blockage to the cutter.

System 20 further comprises bypass structure 60 connected to the outlet of conduit 50 through a stub 55. Bypass structure 60 comprises a cylindrical tube 62 axially aligned with conduit 50 and a cylindrical tube 63 having its axis transverse to the axis of conduit 50. Some of the water is diverted through tube 63, and the rest of the water, along with the potatoes, flows through tube 62. A valve 61 in tube 63 enables control of the quantity of water diverted through such tube. The outlet (not shown) of tube 63 may be coupled to tank 30 or to some other point in the line before or after system 20 where such water can be used or recycled. The outlet of tube 62 is coupled by way of a pair of stubs 80 and 85 into a second tapered conduit 90. The outlet of conduit 90 extends through second bypass structure 110. System 20 further comprises bypass structure 110 connected to conduit 90. Bypass structure 110 comprises a cylindrical tube 113 having its axis transverse to the axis of conduit 90, through which some water is diverted. A valve 111 mounted in tube 113 enables control of the quantity of water diverted through tube 113. The outlet (not shown) of tube 113 may be coupled to tank 30 or to some other point in the line before or after system 20 where such water can be used.

System 20 further comprises a water driven turbine 200 which receives the potatoes and drives a cutter that cuts the potatoes into helical strips. The helical strips exit through a discharge tube 125 or other discharge device. The cut potatoes are delivered to further stations in the line where the potatoes are blanched, dried, fried, frozen, packaged, etc. or processed in any other way.

Figure 3:
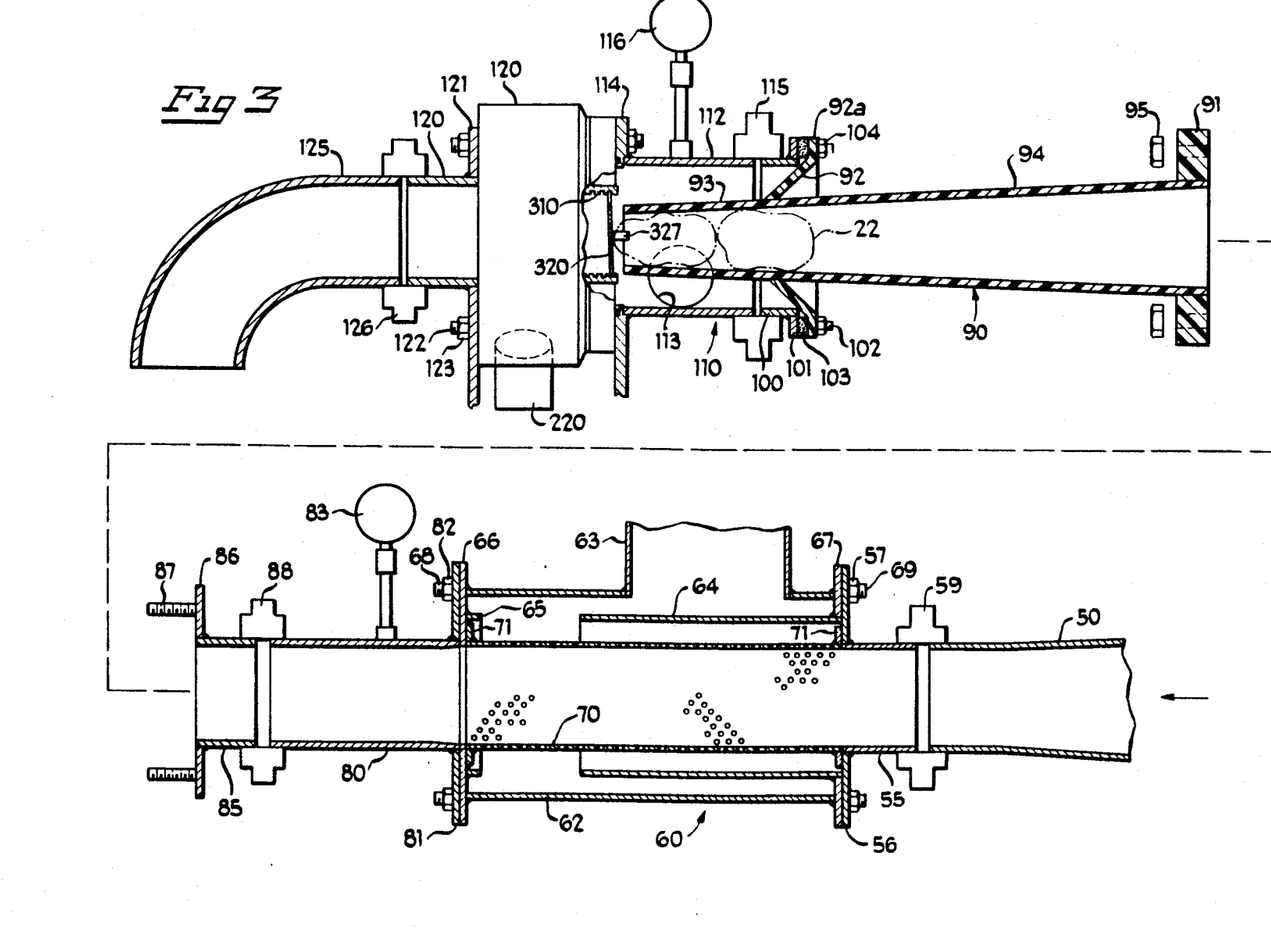
FIG. 3 is a view in section taken along the line 3—3 of FIG. 1, on an enlarged scale, the turbine being unsectioned.

Referring to FIG. 3, further details of bypass structures 60 and 110 and conduit 90 will be described. Bypass structure 60 includes a long sleeve 64 and a short sleeve 65, both being tubular. The diameter of sleeves 64 and 65 is less than the diameter of tube 62. Sleeves 64 and 65 are contained in tube 62 and are coaxial therewith. Sleeve 65 is welded to an end plate 66 and sleeve 64 is welded to an end plate 67. End plate 66 carries axially extending, threaded studs 68, and end plate 67 carries axially extending, threaded studs 69.

Bypass structure 60 further includes a perforated tube 70 which has a length substantially coextensive with the length of tube 62. The ends of tube 70 are welded to round, end flanges 71 which have a diameter slightly less than the diameter of the sleeves 64 and 65. In assembling bypass structure 60, perforated tube 70 is slipped into place, with flanges 71 respectively residing in sleeves 64 and 65.

Stub 55 is welded at its downstream end to a radial flange 56 having holes which receive studs 69. Nuts 57 applied to two studs 69 secure stub 55 to plate 67 and, thus, to bypass structure 60.

Stub 80 is welded at its upstream end to a flange 81 which has a plurality of holes to receive the studs 68. Nuts 82 applied to studs 68 secure stub 80 to plate 66 and, thus, to bypass structure 60. A pressure gauge 83 may be mounted on stub 80 in order to supply information on the water pressure at the outlet of bypass structure 60. Stub 85 is welded to a flange 86 which carries axial studs 87. A coupler 88 connects stubs 80 and 85.

Potatoes from conduit 50 are arranged end to end and are carried by the water into perforated tube 70. Some of the water flows outwardly through the holes in tube 70 and through tube 63. By adjusting valve 61, the quantity of water diverted through tube 63 can be adjusted. By increasing that water flow, the water flow which enters conduit 90 can be reduced, and vice versa.

Figure 3A:
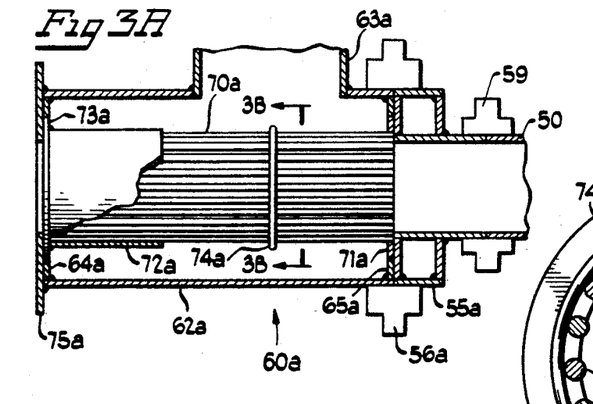
FIG. 3A is a fragmentary view in section depicting an alternative bypass structure.
Figure 3B:
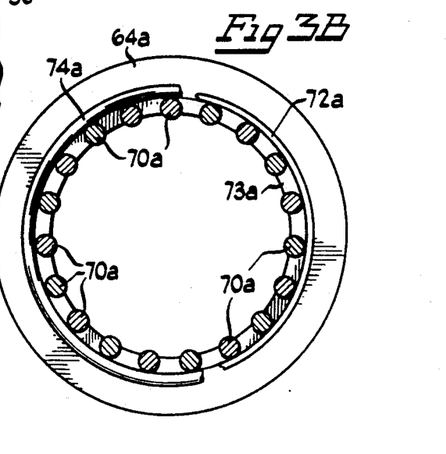
FIG. 3B is an enlarged view in section taken along the line 3B—3B of FIG. 3A, the ring being broken away to expose structure behind it.
Figure 4:
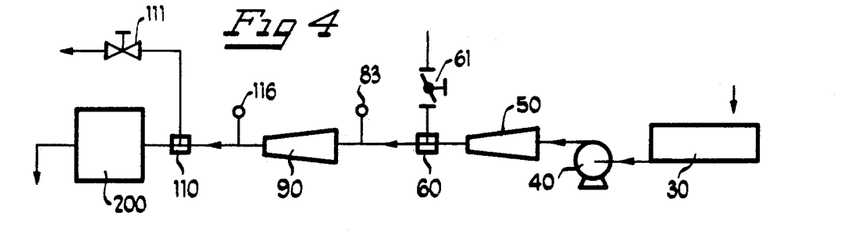
FIG. 4 is a schematic representation of the process coater and potato flow of the system.

FIGS. 3A and 3B depict an alternative bypass structure 60a. Bypass structure 60a comprises a cylindrical tube 62a axially aligned with conduit 50 and a cylindrical tube 63a having its axis transverse to the axis of conduit 50. At the ends of the tube 62a are inwardly directed flanges 64a and 65a, respectively. A multiplicity of rods 70a are disposed parallel to the axis of the system and are arranged in a circle. They are secured at one end to a ring-like flange 71a and at the other end in a sleeve 72a and a ring-like flange 73a. The outer diameter of the flanges 71a and 73a is the same. The flanges 73a and 71a are respectively located in flanges 64a and 65a. A ring 74a encircles rods 70a between the ends thereof to counteract the outward force of the potatoes striking the rods. To assemble, the unit comprising rods 70a and the mounting structure therefor are inserted into tube 62a through flange 65a to a point where flange 73a is disposed against an end flange 75a.

A stub 55a has a flange at each end and is connected to tube 62a by means of a coupler 56a. Flange 75a carries studs (not shown) like studs 68 (FIG. 3) for use in attaching bypass structure 60a to stub 80.

As in the first embodiment, potatoes from conduit 50 are arranged end to end and are carried by the water into the region encircled by rods 70a. Some of the water flows outwardly through the spaces between the rods and through tube 63a. The potatoes pass through and into stub 80 as in the first embodiment.

A radial flange 91 is at one end of conduit 90 and a frustoconical flange 92 is between its ends. Conduit 90 and flanges 91 and 92 are preferably integral and composed of an elastomer such as urethane. It is to be understood that the word "integral" as used throughout the specification and claims is intended to mean integral and one-piece. Flange 92 divides conduit 90 into an outlet portion 93 and an inlet portion 94. In an actual embodiment, portion 94 was about three times the length of portion 93 and conduit 90 had a length of 22.75 inches. In an actual embodiment, the diameter of the mouth of inlet portion 94 is the same as that of the outlet of conduit 50. Conduit 90 delivers the potatoes to a cutter 320 that has an axis coaxial with and that rotates in a plane perpendicular to the axis of such conduit. The outlet of outlet portion 93 has a an inside diameter slightly less than the cross dimension of potatoes 22. As a result, and because conduit 90 is composed of resilient material, the potatoes reaching such outlet, cause a slight deformation of outlet portion 93 and the potato becomes, to some extent, gripped thereby. This gripping action inhibits rotation of the potato although some slippage may take place. To facilitate further this phenomenon, the outlet portion 93 may have a tapering wall thickness. In an operative embodiment, the thickness of the wall of outlet portion 93 in the region of flange 92 was about 0.25 inch and decreased gradually to a thickness of 0.125 inch at the outlet of outlet portion 93. The thickness of portion 94 was 0.25 inch. Conduit 90 ensures alignment of the axes of the potatoes with the center of cutter 320. Flange 92 permits expansion of conduit 90 to accommodate oversized potatoes, yet stiffens such conduit.

A second reasons for conduit 90 being resilient is its ability to accommodate slight variations in the cross dimension of the potatoes.

System 20 could incorporate conduits 90 of various diameters at its outlet, for use in processing potatoes of various cross dimensions. Thus, potatoes could be placed into groups according to their cross dimensions. One group would have a cross dimension X; a conduit 90 having an outlet with a diameter slightly less than X would be installed. In a particular embodiment, the potatoes were sized before being introduced to system 20, being divided into group I having a cross dimension of 2.25 to 2.75 inches and group II having a cross dimension in the range of 1.5 to 2.25 inches. In an operative form of the invention, the outlet of conduit 90 had a diameter of 2.25 inches to accommodate potatoes sized into group I. A conduit 90 having an outlet diameter of 1.75 inches was used when the potatoes were in Group II.

Studs 87 of stub 85 extend through matching holes in flange 91 and are secured by nuts 95. Flange 92 has a radially directed portion 92a at its outer end.

A stub 100 has a radial flange 101 welded thereto, which flange carries axially directed studs 102 which extend through a gasket 103 and aligned holes in flange portion 92a and are secured by nuts 104. Second bypass structure 110 includes a tube 112 which is welded to a radial plate 114. Tube 112 is connected to stub 100 by a coupler 115.

Water and the potatoes will flow through conduit 90 into turbine 200 which is mounted, at its inlet end, to plate 114. Some of the water will be diverted through tube 113, and the rest will flow into turbine 200. The quantity of water flowing through tube 113 is controlled by valve 111. Thus, the more valve 111 is opened, the greater the amount of water is diverted and the lower the flow rate to turbine 200.

In an operating embodiment, 700–1,200 gallons of water per minute flowed through conduit 50, bypass structure 60 was constructed and arranged to divert from 400 to 700 gallons of water per minute depending on the condition of valve 61, 100 to 250 gallons of water per minute flowed through conduit 90, up to 100 gallons of water per minute flowed in bypass structure 110, depending upon the condition of valve 111, and 100 to 200 gallons of water per minute flowed through turbine 200.

In FIG. 3, the inlet of the turbine is broken away to expose cutter 320 and quill 327 carried thereby. The potato is thrown against the cutter so that the quill enters the leading end of the potato so as to help stabilize it. The cutter rotates by action of the turbine, in a manner to be described. The rotating cutter slices the potato helically. The outlet of conduit 90 is very close to cutter 320, in an actual embodiment, the distance being about 1/16 inch.

A stub 120 is welded to a plate 121 which has openings that receive studs 122 on turbine 200. Nuts 123 on studs 122 mount turbine 200 at its outlet end to plate 121. Discharge tube 125 is connected to stub 120 by means of a coupler 126.

Turning now to FIGS. 6 to 9, the details of construction of turbine 200 will be described. Turbine 200 comprises a housing 210 defined by an exterior cylindrical wall 211 and a cylindrical interior wall 212. Wall 212 is spaced inwardly from wall 211, thereby creating an annular chamber 212a therebetween. At the upstream end of wall 212 is an annular recess, of generally L-shape in transverse cross section, defined by a radial surface 213 and an inwardly facing, cylindrical surface 215. Extending through radial wall 224 at the downstream end of turbine 200, between walls 211 and 212 and also continuing in wall 212 is an L-shaped passageway 216. The mouth 214 of passageway 216 is threaded to receive a threaded fitting 214a at the end of suitable tubing or piping. The upstream end of wall 21 defines a flattened, radial shoulder 217 having threaded holes 218 therein. Extending radially through wall 211 at the bottom of housing 210 are two outlets 219 into which are press-fit pipes 220. In an operative embodiment, each such pipe had a diameter of 2.5 inches to enable fast draining. Wall 224 of housing 210 receives a plurality of axially extending bolts 221. A radially extending opening 225 through wall 211 receives a sensor element 225a of an electronic tachometer that is used to measure speed of the rotating part of turbine 200.

Figure 9:
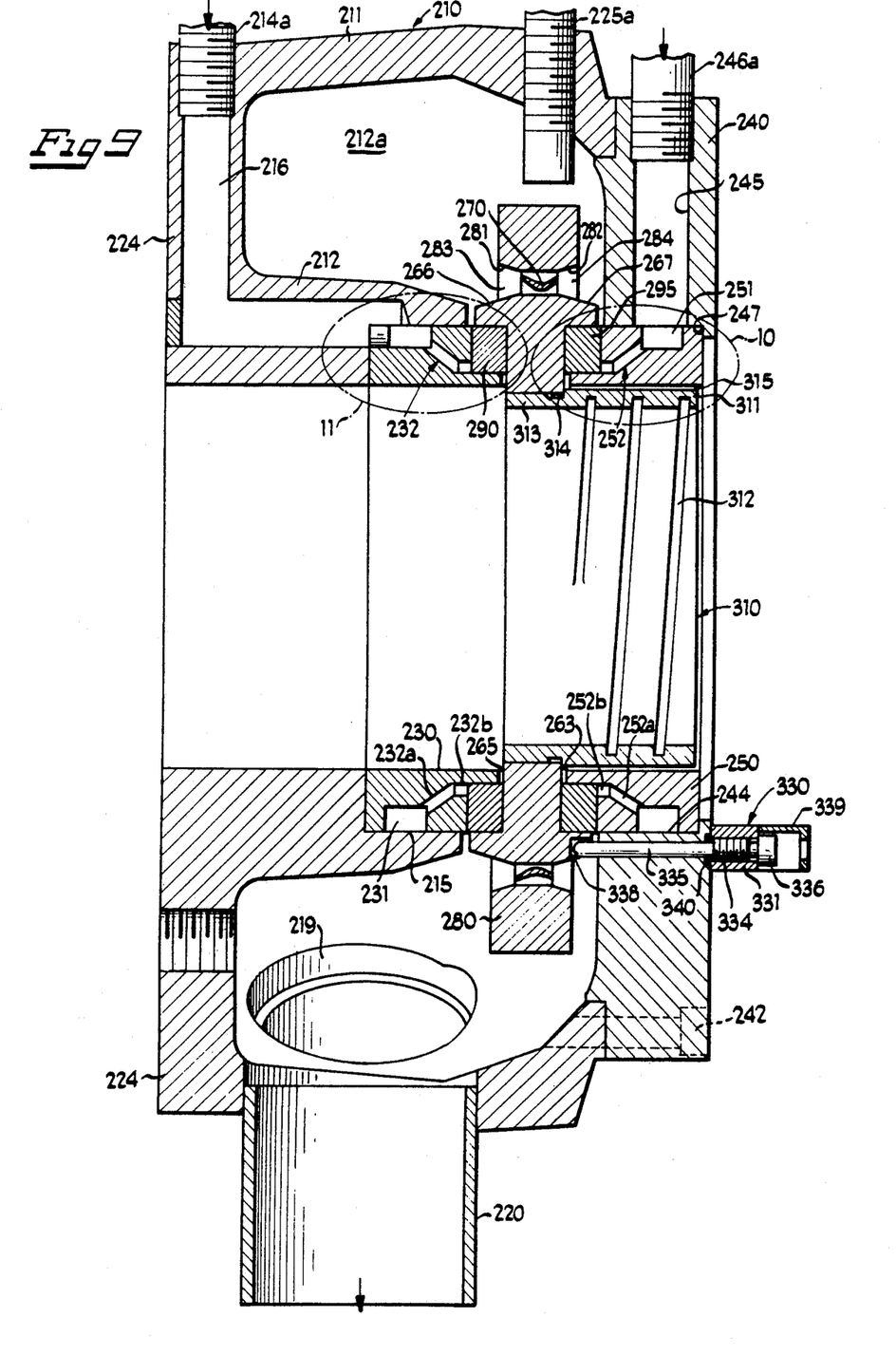
FIG. 9 is an enlarged view in section taken along the line 9—9 of FIG. 7.

Turbine 200 further comprises an annular stator 230 mounted generally centrally in housing 210. An outwardly facing, annular groove 231 is in the periphery of stator 230. Stator 230 includes a plurality of passageways 232 communicating with groove 231. In an operative embodiment, stator 230 had twelve such passageways. Each passageway 232 has a sloped portion 232a and an axial portion 232b. Portions 232a communicate with groove 231 and portions 232b terminate in orifices 234 in surface 236. A notch 235 communicates with groove 231. Stator 230 includes an annular recess which is L-shaped in transverse cross section, defined by a radial bearing surface 236 and a cylindrical bearing surface 237 that faces outwardly.

Stator 230 has an outer diameter equal to the diameter of cylindrical surface 215. Stator 230 is press-fit against surfaces 213 and 215 to create a tight, frictional fit. An annular channel is defined by groove 231 and surface 215, which communicates with passageway 216.

Figure 8:
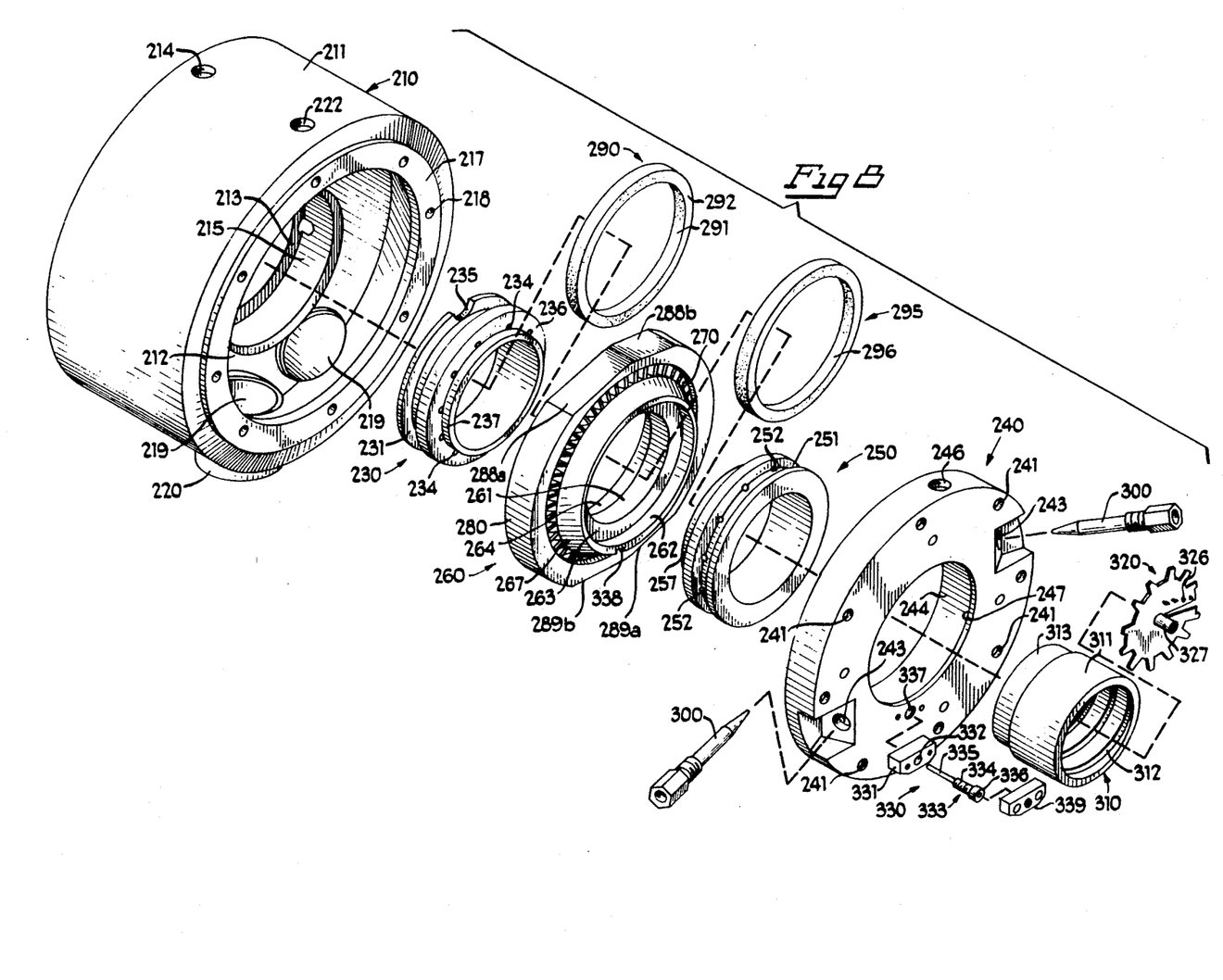
FIG. 8 is an exploded perspective view of the turbine.

Turbine 200 further comprises a cap 240 which has a diameter generally equal to the outer diameter of shoulder 217 and is disposed thereagainst. Holes 218 threadedly receive bolts 242 that also pass through holes 241, to attach cap 240 to housing 210. Cap 240 has a pair of diametrically opposed bores 243 that are inclined inwardly toward the downstream end. In a preferred embodiment, the angle between the axes of these bores and a radial plane perpendicular to the longitudinal axis of the turbine was 22°. Cap 240 has an annular recess of generally L-shape in transverse cross section, defined by a radial surface 247 and a cylindrical, inwardly facing surface 244. Extending radially through cap 240 is a passageway 245 which has a threaded end 246 into which is threaded a fitting 246a at the end of suitable tubing or piping.

Turbine 200 further comprises an annular stator 250. An outwardly facing, annular groove 251 is in the periphery of stator 250. Stator 250 includes a plurality of passageways communicating with groove 251. In an operative embodiment, stator 250 had twelve such passageways. Each passageway has a sloped portion 252a and an axial portion 252b. Portions 252a communicate with groove 251 and portions 252b terminate in orifices 254 (FIG. 10) in surface 256. An annular recess which is L-shaped in transverse cross section is defined by a radial bearing surface 256 (FIG. 10) and a cylindrical bearing surface 257 that faces outwardly.

Turbine 200 further comprises a rotor 260 having an inwardly facing surface 261 which is generally cylindrical. At the upstream end of rotor 260 is an annular recess of L-shape in transverse in cross section, defined by an inwardly facing cylindrical surface 262 and a radial surface 263. At the downstream end of rotor 260 is an annular recess also L-shaped in transverse cross section defined by an inwardly facing cylindrical surface 264 and a radial surface 265. Facing outwardly, at the downstream end of rotor 260, is a conical surface 266, and facing outwardly at the upstream end is a conical surface 267. The generally cylindrical surface between surfaces 266 and 267 carries a multiplicity of vanes 270, the vanes being integral with rotor 260. In an operative embodiment, turbine 200 had sixty-five such vanes.

Turbine 200 further comprises a flywheel 280 which is integral with vanes 270. The flywheel, of course, is for the purpose of stabilizing the speed of rotor 260 so that variations in speed, as the potatoes impinge on the cutter coupled to the rotor, is minimized. At the downstream end of flywheel 280 is an inwardly facing conical surface 281, and, at its upstream end is an inwardly facing conical surface 282. The width of each vane 270 is less that the width of flywheel 280 and rotor 260, whereby there is created a channel 283 between surfaces 266 and 281 and vanes 270. Similarly, a channel 284 is defined between surfaces 267 and 282 and vanes 270. The circumferential surface of flywheel 280 includes flattened portions 288a, b and 289a, b to be sensed by a tachometer pick up, without unbalancing the flywheel.

This construction of rotor 260, vanes 270 and flywheel 280 is highly advantageous. Usually, a flywheel is mounted on the shaft of rotation, outboard of the rotor. This requires a separate set of bearings. Incorporating the flywheel onto the outside of the rotor and the vanes and making the parts integral also facilitates manufacture. Moreover, the force of the water carrying the potatoes is not directed at the flywheel since the flywheel is radially outside the main water force.

Figure 10:
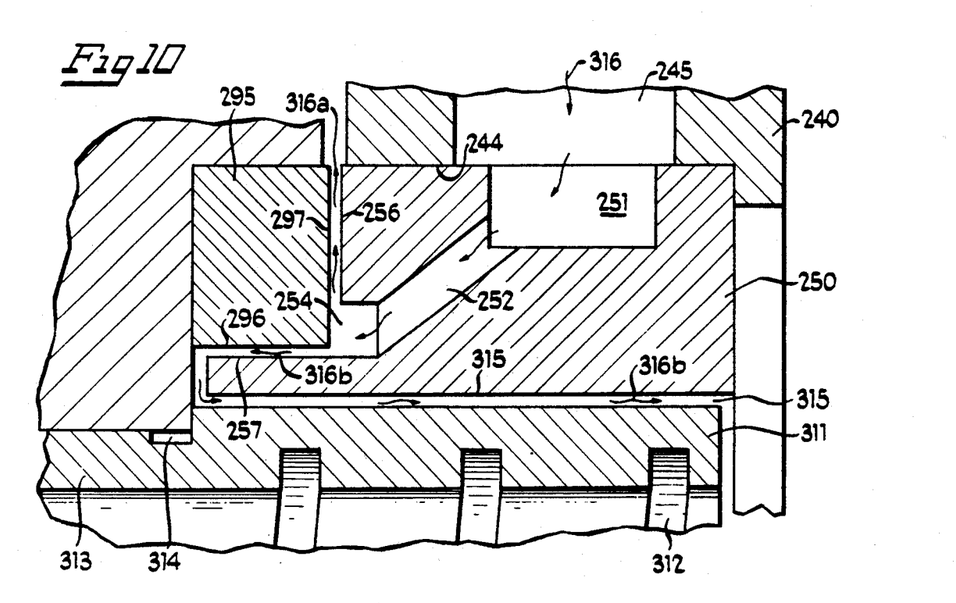
FIG. 10 is an enlarged view of the portion of the turbine of FIG. 9 within the ellipse 10.

Turbine 200 further comprises a ring bearing 290 being of rectangular cross section and including an inwardly facing cylindrical bearing surface 291 and a radial bearing surface 292. Bearing 290 is press fit into the downstream recess of rotor 260 defined by surfaces 264 and 265. Similarly turbine 200 includes a second bearing ring 295 which is press fit into the upstream recess of rotor 260 defined by surfaces 262 and 263. Bearing ring 295 has an inwardly facing cylindrical bearing surface 296 and a radial bearing surface 297 (FIG. 10).

In an operative embodiment of the invention, bearings 290 and 295 had a graphite-copper composition. Bearings made of such material are brittle, so that drilling of mounting holes is undesirable. Press fitting of the mounting rings is, therefore, an important feature.

Turbine 200 further comprises a cutter carrier 310 which is generally cylindrical and includes a body 311 and a neck 313. At the juncture between body 311 and neck 313 is a groove to permit slight deformation of neck 313. The outer diameter of neck 313 generally matches the inner diameter of rotor 260. Neck 313 is press fit into rotor 260, relief groove 314 accommodating some flexing movement to ensure a tight fit. The outer diameter of body 313 is slightly less than the inner diameter of stator 250 so that there is thus created a narrow cylindrical gap 315.

Because turbine 200 is circumferentially supported on stators 230 and 250, no central shaft is required and no belt or gear drive is necessary, leaving a cavity within the turbine open through which cut strips are transported.

Referring to FIG. 10, the manner in which water lubricates the bearing surfaces will be described. Water is delivered through fitting 246a (FIG. 8), passageway 245 and into annular groove 251, as shown by arrows 316. The water continues through passageways 252 exiting at orifices 254 in radial bearing surface 256. Water flows in the space between bearing surface 256 on stator 250 and bearing surface 297 on bearing ring 295, as represented by arrows 316a. The lubricating water flows outwardly into chamber 212a (FIG. 9) and then ultimately out of turbine 200 through drain tubes 220. Also, water flows between cylindrical bearing surface 257 on stator 250 and cylindrical bearing surface 296 on bearing ring 295, as represented by arrow 316b. The water delivered between these bearing surfaces acts like a lubricant to facilitate rotation of rotor 260. The water operates to reduce friction.

The water continues along the path represented by the arrows 316b through gap 315. Water in which the potatoes are entrained flows toward the gap 315 from right to left as viewed in FIG. 10. This water is likely to have potato scraps, field dirt, starch, etc. deleterious to the lubricating action between the bearing surfaces. The lubricating water which flows in the direction represented by the arrows 316b tends to block the potato water from entering gap 315 and also flushes gap 315 so as to keep it clean.

Figure 11:
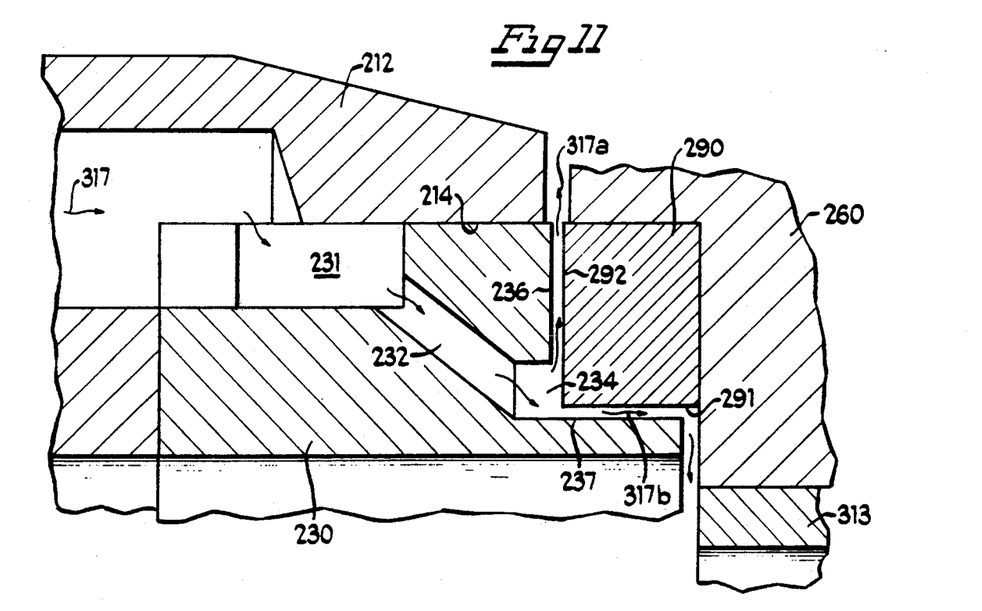
FIG. 11 is an enlarged view of the portion of the turbine of FIG. 9 within the ellipse 11.

Referring to FIG. 11, the manner in which water lubricates the bearing surfaces will be described. Water is delivered through fitting 214a (FIG. 9), passageway 216 and into annular groove 231, along the path represented by arrows 317. The water continues through passageways 232 exiting at orifices 234 in radial bearing surface 236. Water flows in the space between bearing surface 236 on stator 250 and bearing surface 292 on bearing ring 290, as represented by arrows 317a. The lubricating water flows outwardly in chamber 212a (FIG. 9) and out of turbine 200 through drain tubes 220. Also, water flows between cylindrical bearing surface 237 on stator 250 and cylindrical bearing surface 291 on bearing ring 290, as represented by arrow 317b. The water delivered between these bearing surfaces acts like a lubricant to facilitate rotation of rotor 260.

The spaces between the bearing surfaces depicted in FIGS. 10 and 11 are exaggerated simply to show the relationship. By mounting bearings 290 and 295 on the rotating part, they can be effectively lubricated with clean, external water. Because rotating bearing surfaces 292 and 297 are rougher than the corresponding stationary surfaces 236 and 256, more liquid is dragged along surfaces 292 and 297 at its speed of rotation than along surfaces 236 and 256. This centrifugal force on the rotating water will move it radially outward causing a pumping action. This produces improved lubrication and cooling flow across bearing surfaces 236 and 292 and bearing surfaces 256 and 297.

Figures 12, 13, 14, 15, 16, 17:
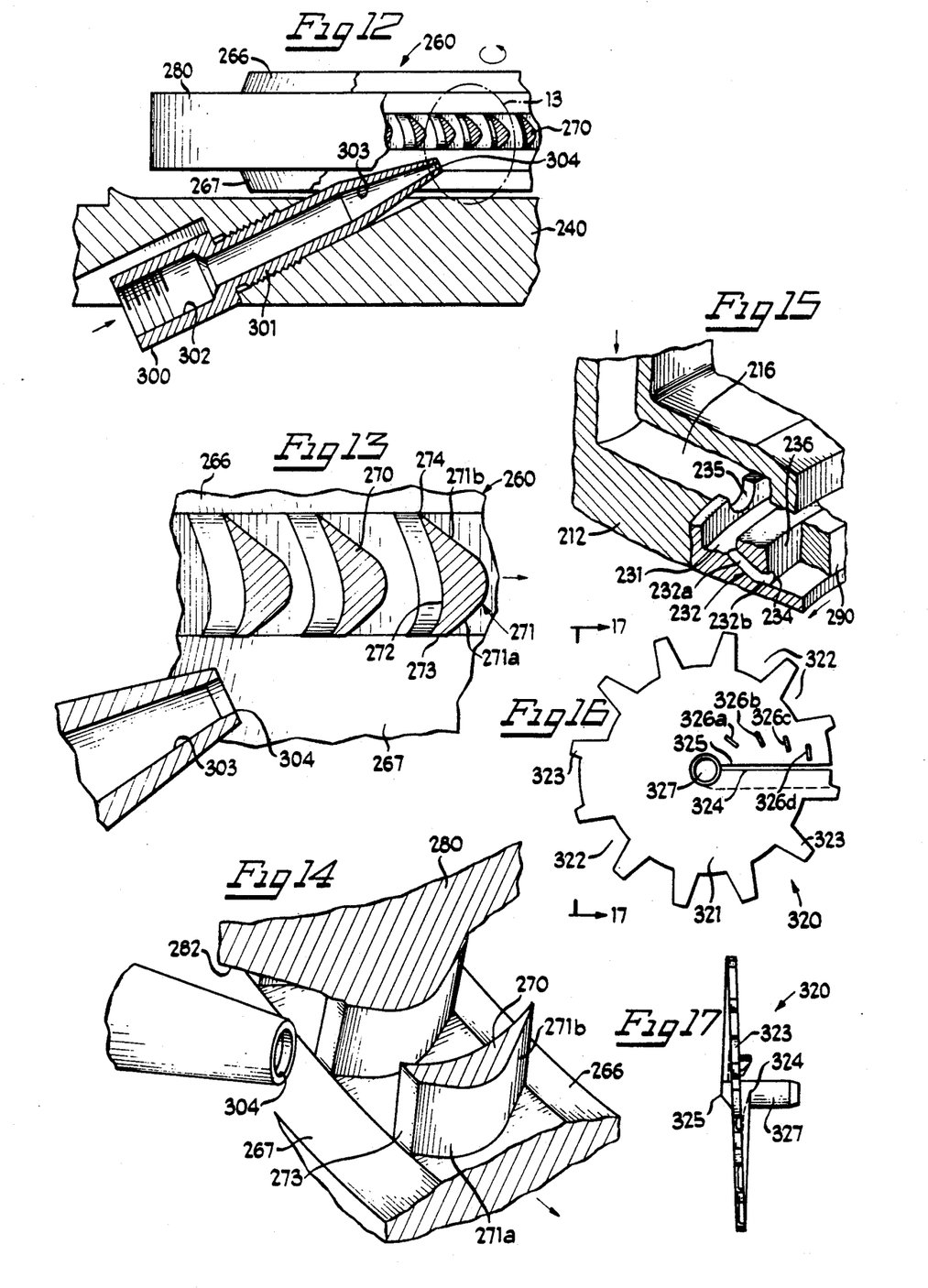
FIG. 12 is an enlarged view in section taken along the line 12—12 of FIG. 7.
FIG. 13 is an enlarged view of the portion of the turbine of FIG. 12 within the ellipse 13.
FIG. 14 is a perspective, sectional and fragmentary view depicting the relationship of the nozzle tip and the vanes on the rotor.
FIG. 15 is a perspective view depicting details of the path of lubricating water through the housing and the downstream stator.
FIG. 16 is a plan view of the cutter.
FIG. 17 is an end view taken along the line 17—17 of FIG. 16.

As shown in FIG. 8, turbine 200 further comprises a pair of nozzles 300. Referring to FIG. 12, each nozzle 300 includes a threaded body 301 which is threaded into the associated bore 243 in cap 240. Nozzle 300 has an internal passageway with a threaded inlet 302 that receives a fitting coupled to a source of water. The passageway has a tapering wall 303 which terminates in an exit tip 304. Water is delivered to nozzles 300 to create a jetstream emanating from tip 304 directed at vanes 270 which causes rotor 260 to spin at high speed. Two nozzles are provided in order to balance the radial forces produced thereby.

Any water exiting a nozzle tends to spread at least to some extent with a resultant loss in kinetic energy. The velocity of the water exiting nozzle 300 in an operative embodiment was 400 to 500 feet per second. With such high velocity, it is important that the amount of spreading be minimized. The tapered interior wall 303 directs the droplets toward the center, which counteracts the effect of such spreading. At the point where the jet impinges on blades 270, it has approximately the same diameter and kinetic energy as at tip 304. This is an important feature of nozzle 300. In an operative embodiment, the semi-vertical angle of the conical surface of wall 303 was 7.5°.

In an operative embodiment, the angle between the axis of each nozzle 300 and the plane of rotation of rotor 260 was about 22°. As can be seen in FIGS. 12, 13 and 14, tip 304 resides in channel 284 of rotor 260, that is, in the space between conical surfaces 267 and 282 (see FIG. 9). When water from nozzle 300 strikes vanes 270, it undesirably sprays and ricochets. By positioning tip 304 within channel 284, such adverse effects are minimized, thereby raising the efficiency of the turbine. Also, the jet emanated from nozzle 300 is inside the sheet of lubricating water which exists in the space between cap 240 and rotor 260 (FIG. 9).

Another important feature of turbine 200 is the fact that inlet end 273 of each vane 270 is flat and radial. Such a configuration reduces the runaway speed of the turbine, that is, the speed of the turbine when unloaded. In an operative embodiment, the turbine speed was 7,000 to 12,000 rpm. With the usual vane design, the no-load speed doubles, which would yield a runaway speed of 12,000 rpm or more, much too high and much too dangerous. By using a vane design with a flat receiving end, the runaway speed is reduced. The use of a vane having a flat, radial entry end has been found to be highly advantageous in terms of maximizing turbine efficiency.

Referring to FIG. 13, each vane 270 has a parabolic-like leading edge 271 and a slightly curved trailing end 272, and a flat radial upstream end 273 and a sharp downstream end 274. Leading edge 271 has generally flat portions 271a and 271b. The angle of surface portion 271b of each vane 270 is designed so that at the designed speed of rotor 260, water exits therefrom generally axially. In an operative embodiment, the angle between portions 271a and 271b and the plane of rotation of rotor 260 was 42.5°.

Mounted in carrier 310 is cutter 320 the details of which are best seen in FIGS. 16 and 17. Cutter 320 includes a right helicoid body 321 having a plurality of slots 322 in its periphery, defining a plurality of radial projections 323. Cutter 320 is slit radially to produce a pair of edges 324 and 325 which are substantially parallel and axially displaced. The leading edge 324 is sharpened to create a blade. Quill 327 projects axially from the center of body 321.

Cutter 320 rotates counterclockwise, as viewed in FIG. 16. Mounted on the upstream face of cutter 320 are four slitter blades 326a, b, c and d, in the particular embodiment depicted. Blade 326a being innermost is leading, blade 326b is intermediate and trails blade 326a, blade 326c is next and trails blade 326b, and blade 326d is outermost and trails blade 326c. In an operative embodiment, the angles between edge 324 and the midpoints of blades 326a, b, c and d were respectively about 49°, 30°, 18° and 9°. This construction causes the strips, as they are formed, to move outwardly to minimize jamming of the strips between the slitter blades and against quill 327.

Cutter 320 is mounted in carrier 310 by rotating cutter 320 into helical groove 312 (FIGS. 8, 9), whereby it will be mounted as depicted in FIG. 3. As explained above, in an operative embodiment, the turbine operated at 6,000 rpm or 100 revolutions per second. The distance between edges 324 and 325 was about 0.3 inch, whereby twenty-five inches of potato are cut per second, which means that it takes less than, 0.25 second to cut an entire potato. In such operative embodiment, the turbine was operated at a speed of up to 8,500 rpm, which would increase these numbers proportionately.

As was previously explained, the potatoes are thrown with great force against cutter 320 so that the potato becomes impaled on quill 327. Also, turbine 200 tends to suck or draw the potato in as it cuts because of the differential pressure across the inlet and the outlet of the turbine cutter passage. The resilient construction of outlet portion 93 of conduit 90 inhibits rotation of potato in response to rotation of cutter 320. As the cutter rotates in response to the turbine, the cutting edge 324 slices the potato into a helix and slitter blades 326a, b, c slit the helical slice into strips. These strips are delivered through stub 120 and discharge tube 125 to the next processing station in the line. Some of the water in conduit 90 is bypassed through tube 113 as previously described. The slots 322 in cutter 320 accommodate the rest of the water flow. The water passing through the slots carries the helical potato strips to the next stage.

During servicing of turbine 200, it is desirable to prevent rotor 260 from rotating. To that end, there is provided a latch mechanism 330. Referring to FIGS. 8 and 9, such mechanism includes a base 331 having a threaded hole 332 therethrough. Latch mechanism 330 also includes a pin 333 having a threaded body 334, a finger 335 and a head 336. Body 334 is attached to cap 240 such that threaded hole is aligned with a hole 337 in cap 240. FIG. 9 depicts latch mechanism in its latching condition, that is, pin 333 in its extended position to the left, such that the tip of finger 335 resides in a notch 338 in rotor 260, whereby rotor 260 cannot rotate. During normal operation, the operator grips head 336 and rotates same to withdraw the tip of finger 335 from notch 338. A cover 339 is provided to prevent inadvertent operation of the latch mechanism. An 0-ring 340 prevents "potato water" upstream of turbine 200 from mixing with lubricating water downstream of cap 240. The cutter needs to be replaced periodically because the cutting edge 324 or slitter blades 326a, b, c dull or the like. With latch mechanism 330 in its latching condition, the cutter 320 can be removed and replaced.

An important feature of the turbine is its open center, to enable cut potatoes to pass through it. Although the turbine has been described as an element in a system for producing helical vegetable strips, it is to be understood that it can be used in other vegetable cutting operations and other systems involving a rotating element.

Figure 5:
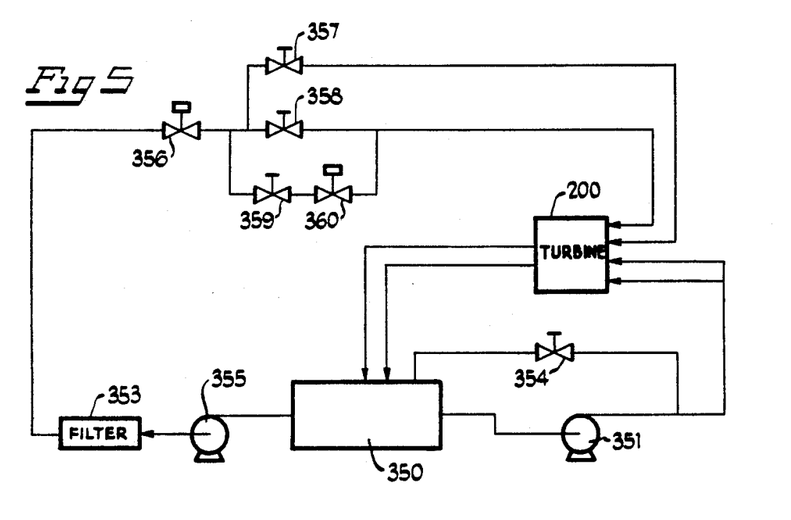
FIG. 5 is a schematic representation of the turbine control water flow in the system.
Figure 6:
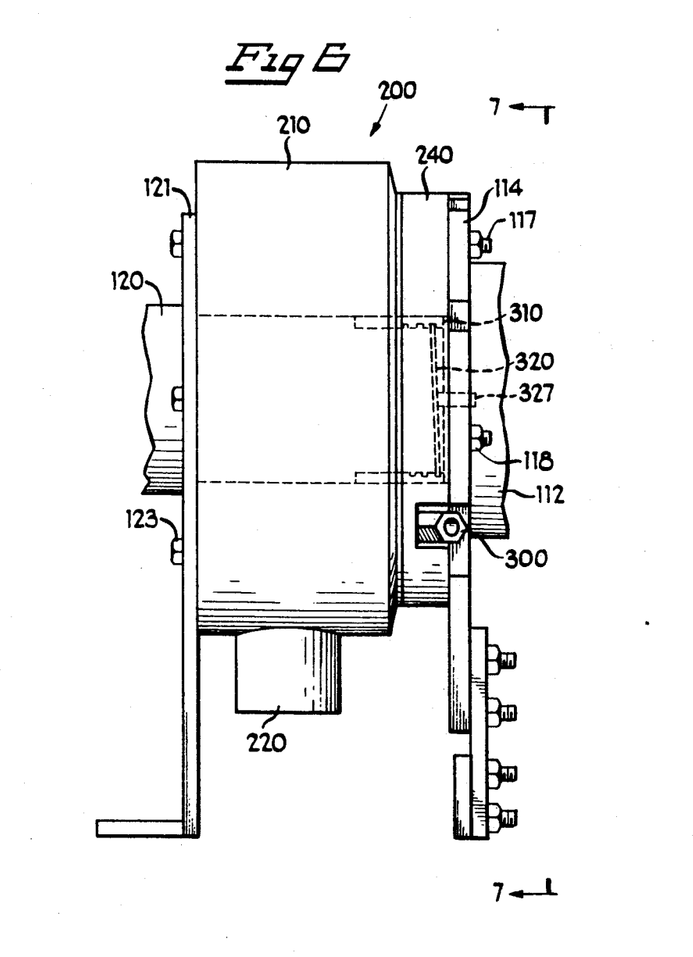
FIG. 6 is an elevational side view of the turbine.
Figure 7:
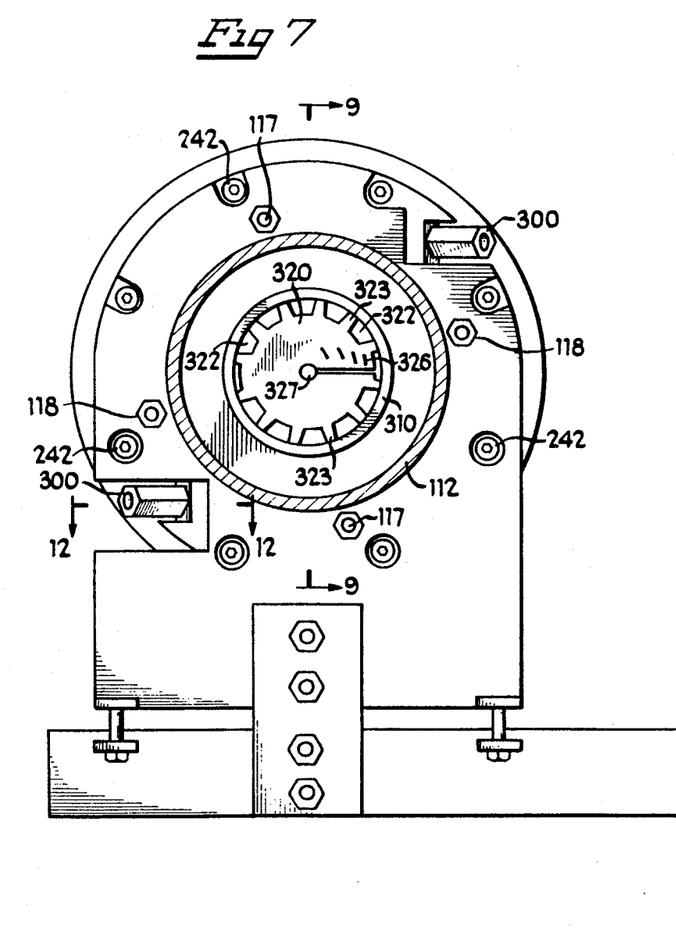
FIG. 7 is an elevational end view of the turbine.

Referring to FIG. 5, the details of the flow of water in connection with operation of the turbine will be described. Water is stored in a reservoir 350. It is delivered by a pump 351 to nozzles 300 in turbine 200. Pump 351 provides the high pressure water necessary to enable the nozzles to produce the jets to drive rotor 260. A second pump 355 also draws water from reservoir 350 and drives it through a filter 353, a solenoid valve 356, a pair of manual valves 357 and 358, respectively, to fittings 214a and 246a (FIG. 9) in turbine 200. These two valves control the flow of lubricating water. A valve 354 is used to control speed of the turbine. Valve 358 controls the quantity of lubricating water to the downstream end of rotor 260 while valve 357 controls the volume of lubricating water to its upstream end. The lubricating water creates opposing axial forces on the rotating parts of turbine 200. The main water flow carrying the potatoes also creates a downstream, axial force on the turbine. Valves 357 and 358 are usually adjusted so that these three forces balance out and there is little or no axial force created by the water. Valve 359 provides more water to the downstream bearing when the main flow starts. Valve 360 is solenoid operated and automatically opens in response to potato flow. Some water is lost from the system and, therefore, reservoir 350 must be periodically replenished. Therefore, a fresh-water line (not shown) may be connected as a further input to reservoir 350. In an operative embodiment, pump 355 increased the pressure of the water such that the pressure from the nozzles was 1,000 to 1,200 psi. Preferably, it should be 2,000 psi or greater.

The lubricating water and nozzle water exit the turbine along with some of the potato carrying water, through the drain pipes 220. The water to nozzles 300 should be clean, but it need not be ultraclean. However, the water delivered to turbine 200 to be used as lubricating water should be very clean. Therefore, filter 353 is provided to purify the water from reservoir 350. It is to be understood that the lines in FIG. 5 are schematically shown and include combinations of hoses and/or pipes. In an actual embodiment, flowmeters and pressure gauges were incorporated at various points in the system.

While the foregoing description has been in respect to use of system 20 to cut potatoes into generally helical strips, it is to be understood that the same principles would be applicable to systems to cut other kinds of vegetables into helical strips.

What has been described therefor is improved system for cutting vegetables into helical strips. The quantity of potatoes cut into helical strips has been very substantially increased to 6,000 pounds per hour or more. Incorporated in such system is a turbine which utilizes water as a lubricant so that contamination attendant on use of hydrocarbon lubricants does not occur. The system and the turbine used therein is simpler and less expensive to construct and maintain.

While a preferred embodiment of the present invention has been described, it is to be understood that the scope of the invention is defined by the following claims.

What is claimed is:

1. A hydraulic system for cutting vegetables into generally helically shaped strips comprising input means for receiving a liquid carrier and the vegetables, a conduit for the liquid carrier and the vegetables, said conduit having an inlet and an outlet, pump means coupled between said input means and said inlet for transporting the liquid carrier and the vegetables through said conduit, a turbine coupled to said outlet and including a rotor and a multiplicity of vanes thereon and at least one nozzle aimed at said vanes, said nozzle being adapted to generate a jet of liquid to cause rotation of said rotor, and a cutter coupled to said rotor and being rotated thereby, said cutter including means for slicing the vegetables into helical strips, said turbine further including an axially extending passageway therethrough for accommodating evacuation of the helically shaped strips and the liquid carrier.

2. The hydraulic system of claim 1, wherein said input means includes a tank.

3. The hydraulic system of claim I, wherein said liquid carrier and the liquid from said nozzle are water.

4. The hydraulic system of claim I, wherein said cutter has a right helicoid configuration and has a radial slit therethrough defining a pair of edges, said edges being axially displaced from each other, at least one of said edges being sharpened to define said slicing means.

5. The hydraulic system of claim 4, wherein said edges are substantially parallel.

6. The hydraulic system of claim 4, wherein said edges are spaced apart about 0.3 inch.

7. The hydraulic system of claim 1, wherein said cutter includes at least one opening near the periphery thereof to accommodate passage of the liquid carrier.

8. The hydraulic system of claim 1, wherein said cutter includes a plurality of openings around the periphery thereof to accommodate passage of the liquid carrier.

9. The hydraulic system of claim 1, wherein the sole coupling of said cutter to said rotor is at the periphery of said cutter.

10. The hydraulic system of claim 1, wherein the operating speed of said cutter is at least about 6,000 rpm.

11. The hydraulic system of claim 1, wherein about 100 to 200 gallons of the liquid carrier flow through said cutter per minute.

12. The hydraulic system of claim 1, wherein the outlet of said conduit is in close proximity to said cutter.

13. The hydraulic system of claim 1, wherein the outlet of said conduit is spaced on the order of about 1/16 inch from said cutter.

14. The hydraulic system of claim 1, wherein said conduit is composed of an elastomer.

15. The hydraulic system of claim 1, and further comprising means between said conduit and said turbine for diverting some of the liquid carrier away from said turbine.

16. A hydraulic system for cutting vegetables into generally helically shaped strips comprising input means for receiving a liquid carrier and the vegetables, a tapered conduit for the liquid carrier and the vegetables, said conduit having an inlet and an outlet and being tapered from said inlet to said outlet, pump means coupled between said input means and said inlet for transporting the liquid carrier and the vegetables through said conduit, a turbine coupled to said outlet and including a rotor and a multiplicity of vanes thereon and at least one nozzle aimed at said vanes, said nozzle being adapted to generate a jet of liquid to cause rotation of said rotor, and a cutter coupled to said rotor and being rotated thereby, said cutter including means for slicing the vegetables into helical shapes, said turbine further including an axially extending passageway therethrough for accommodating evacuation of the helically shaped strips and the liquid carrier.

17. The hydraulic system of claim 16, wherein about 400 to 700 gallons per minute flow through said conduit.

18. The hydraulic system of claim 16, wherein the outlet of said conduit is in close proximity to said cutter.

19. The hydraulic system of claim 16, wherein said conduit is composed of a flexible material to accommodate variations in the size of the vegetables.

20. The hydraulic system of claim 16, wherein said conduit is composed of urethane.

21. The hydraulic system of claim 16, wherein said conduit carries flange means intermediate said inlet and said outlet for attachment to mounting structure, said flange dividing said conduit into a downstream portion and an upstream portion.

22. The hydraulic system of claim 21, wherein said conduit and said flange are integral.

23. The hydraulic system of claim 21, wherein said flange is generally frustoconical.

24. The hydraulic system of claim 21, wherein said downstream portion is constructed and arranged to resiliently grip the vegetable passing therethrough to facilitate cutting thereof.

25. The hydraulic system of claim 21, wherein the wall of said downstream portion is increasingly thinner from said flange to said outlet.

26. The hydraulic system of claim 16, and further comprising diverting means between said conduit and said turbine for diverting some of the liquid carrier away from said turbine.

27. A hydraulic system for cutting vegetables into generally helically shaped strips comprising input means for receiving a liquid carrier and the vegetables, tapered first and second conduits for the liquid carrier and the vegetables, said conduits being coupled in tandem, each of said conduits having an inlet and an outlet and being tapered from said inlet to said outlet, pump means coupled between said input means and the inlet of said first conduit for transporting the liquid carrier and the vegetables through said conduits, a turbine coupled to the outlet of said second conduit and including a rotor and a multiplicity of vanes thereon and at least one nozzle aimed at said vanes, said nozzle being adapted to generate a jet of liquid to cause rotation of said rotor, a cutter coupled to said rotor and being rotated thereby, said cutter including means for slicing the vegetables into helical strips, and means between said conduits for diverting some of the liquid carrier away from said second conduit.

28. The hydraulic system of claim 27, wherein said first conduit is composed of rigid material and said second conduit is composed of flexible material.

29. The hydraulic system of claim 27, wherein the outlet of said second conduit is in close proximity to said cutter.

30. The hydraulic system of claim 27, wherein said first conduit is composed of metal and said second conduit is composed of an elastomer.

31. The hydraulic system of claim 27, wherein said second conduit is composed of urethane.

32. The hydraulic system of claim 27, wherein said second conduit carries a flange for attachment to mounting structure.

33. The hydraulic system of claim 32, wherein said flange is generally frustoconical.

34. The hydraulic system of claim 33, wherein said flange is integral with said second conduit.

35. The hydraulic system of claim 27, wherein said diverting means includes a housing and a perforated tube therethrough and a bypass conduit extending generally transversely to said perforated tube, said perforated tube extending between said first and second conduits to enable the vegetables to pass axially therethrough and some of the liquid carrier to pass transversely therethrough and into said bypass conduit.

36. The hydraulic system of claim 35, wherein said diverting means includes adjustable valve means in said bypass conduit for selectively adjusting the amount of liquid carrier to be diverted into said bypass conduit.

37. The hydraulic system of claim 36, wherein said valve means is of the butterfly type.

38. The hydraulic system of claim 27, wherein said second conduit carries flange means intermediate said inlet and said outlet for attachment to mounting structure, said flange dividing said second conduit into a downstream portion and an upstream portion.

39. The hydraulic system of claim 38, wherein the wall of said downstream portion is increasingly thinner from said flange to said outlet.

40. The hydraulic system of claim 27, wherein said downstream portion includes means for resiliently gripping the vegetable passing therethrough to facilitate cutting thereof.

41. The hydraulic system of claim 27, wherein the length of said first conduit is on the order of about three times the length of said second conduit.

42. The hydraulic system of claim 27, wherein the outlet of the said first conduit and the inlet of said second conduit have substantially the same diameter.

43. The hydraulic system of claim 27, wherein the diameter of the outlet of said second conduit is on the order of 2.25 inches.

44. The hydraulic system of claim 27, wherein the diameter of the outlet of said second conduit is on the order of 1.75 inches.

45. The hydraulic system of claim 27, and further comprising adjustable means for selectively adjusting the amount of liquid carrier to be diverted.

46. A hydraulic system for cutting vegetables into generally helical strips comprising input means for receiving a liquid carrier and the vegetables, tapered first and second conduits for the liquid carrier and the vegetables, said conduits being coupled in tandem, each of said conduits having an inlet and an outlet and being tapered from said inlet to said outlet, pump means coupled between said input means and the inlet of said first conduit for transporting the liquid carrier and the vegetables through said conduits, a turbine coupled to the outlet of said second conduit and including a rotor and a multiplicity of vanes thereon and at least one nozzle aimed at said vanes, said nozzle being adapted to generate a jet of liquid to cause rotation of said rotor, a cutter coupled to said rotor and being rotated thereby, said cutter including means for slicing the vegetables into helical strips, first diverting means between said conduits for diverting some of the liquid carrier away from said second conduit, and second diverting means between said second conduit and said turbine for diverting more of the liquid carrier from said turbine.

47. The hydraulic system of claim 46, wherein said first diverting means includes first flow adjusting means and said second diverting means includes second flow adjusting means.

48. The hydraulic system of claim 46, wherein about 700 to 1,200 gallons of liquid carrier per minute flow into said first diverting means and up to about 100 gallons of liquid carrier per minute flow through said second diverting means.

49. The hydraulic system of claim 46, wherein about 500 to 800 gallons of liquid carrier per minute flow through said first conduit and 100 to 250 gallons of liquid carrier per minute flow through said second conduit.

50. The hydraulic system of claim 27, wherein said diverting means includes a multiplicity of axially disposed rods arranged in a loop and a bypass conduit extending generally transverse to said rods, said rods extending between said first and second conduits to enable the vegetables to pass axially therethrough and some of the liquid carrier to pass transversely therethrough and into said bypass conduit.

51. A hydraulic system for cutting vegetables into generally helically shaped strips comprising input means for receiving a liquid carrier and the vegetables, a conduit for the liquid carrier and the vegetables, said conduit having an inlet and an outlet, pump means coupled between said input means and said inlet for transporting the liquid carrier and the vegetables through said conduit, a turbine coupled to said outlet and including a rotor and a multiplicity of vanes thereon and at least one nozzle aimed at said vanes, said nozzle being adapted to generate a jet of liquid to cause rotation of said rotor, a cutter coupled to said rotor and being rotated thereby, said cutter including means for slicing the vegetables into helical strips, said turbine further including at least one stator carrying said rotor and spaced therefrom, and means for applying into the space between said stator and said rotor water as the sole lubrication therefor.

* * * * *